(12) United States Patent
Honda et al.

(10) Patent No.: US 6,975,598 B2
(45) Date of Patent: Dec. 13, 2005

(54) DATA TRANSMISSION APPARATUS WITH A DATA TRANSMISSION AMOUNT CONTROLLABLE AND A METHOD THEREFOR

(75) Inventors: Takeshi Honda, Aich (JP); Hiroshi Nagaya, Aich (JP); Kazutoshi Komatsu, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 990 days.

(21) Appl. No.: 09/818,120

(22) Filed: May 4, 2001

(65) Prior Publication Data

US 2001/0055280 A1 Dec. 27, 2001

(30) Foreign Application Priority Data

Jun. 8, 2000 (JP) .................................... 2000-177118

(51) Int. Cl.[7] .............................................. H04B 7/005
(52) U.S. Cl. ....................................... 370/278; 370/329
(58) Field of Search ................................ 370/278, 281, 370/341, 488–493, 463–469, 244, 252, 316, 230.1, 474, 453; 375/240.03, 346, 285, 345; 455/427, 453, 524; 714/4, 43, 47, 51, 56

(56) References Cited

U.S. PATENT DOCUMENTS 4,918,746 A * 4/1990 Serizawa .................... 455/524
5,383,186 A * 1/1995 Shin et al. .................. 370/453
6,208,629 B1 * 3/2001 Jaszewski et al. .......... 370/329
6,487,261 B2 * 11/2002 Iwamatsu et al. ........... 375/346
6,512,741 B1 * 1/2003 Kohzuki et al. ......... 370/230.1
6,625,172 B2 * 9/2003 Odenwalder et al. ....... 370/474
6,671,512 B2 * 12/2003 Laakso ....................... 455/453
6,721,282 B2 * 4/2004 Motley ....................... 370/252

* cited by examiner

*Primary Examiner*—Chi Pham
*Assistant Examiner*—Prenell Jones
(74) *Attorney, Agent, or Firm*—Rabin & Berdo, P.C.

(57) ABSTRACT

The maximum transmittable amount value (outmax) and the average transmission amount value (average) stored in a transmission amount setting circuit are supplied to a maximum transmission amount manager, a transmission result amount manager, and a maximum transmission amount calculator, respectively. The average transmission amount value is added up and updated in the maximum transmission amount manager, and the data transmission amount value (rvs) output from a data transmitter is added up and updated in the transmission result amount manager. These added-up values are reset under predetermined conditions to prevent an overflow. Based on the values added up in this way, the maximum amount of data to be transmitted is determined and, with this value as the threshold, a data transmission request is output from the data transmitter to a data receiver unit.

9 Claims, 7 Drawing Sheets

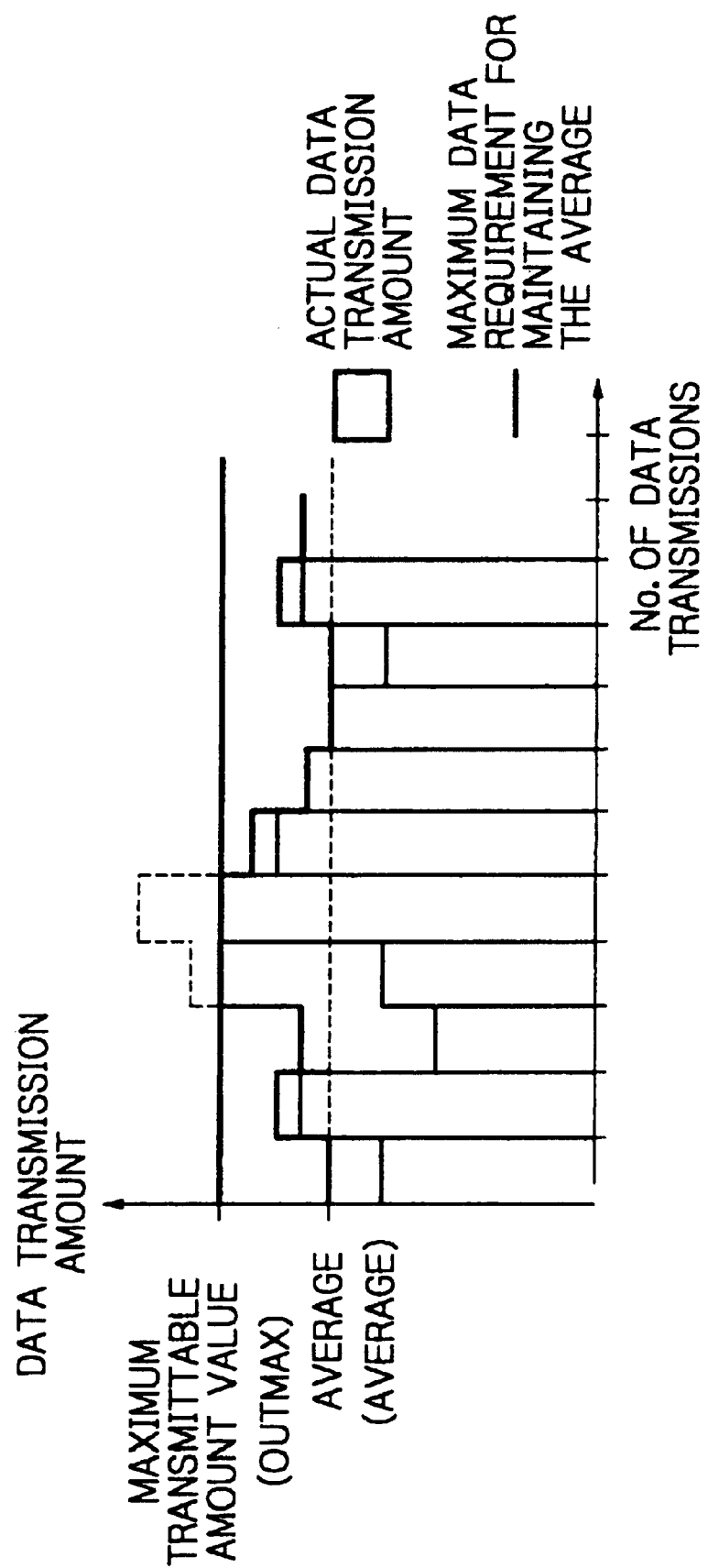

DATA TRANSMISSION APPARATUS WITH A DATA TRANSMISSION AMOUNT CONTROLLABLE AND A METHOD THEREFOR

BACKGROUND OF THE INVENTION

1. Field of the Invention

The present invention relates to a data transmission apparatus for transmitting a data signal to a data receiver unit and a method of controlling data transmission with the data transmission amount self-controlled.

2. Description of the Background Art

When transmitting a data signal from a data transmission unit to a higher-level data receiver unit, the following requirement must be satisfied. That is, the maximum amount of data transmitted at a time is predetermined. In addition, the average amount of transmission data must not exceed a predetermined amount. The average transmission amount is calculated by dividing the total transmission amount by the number of transmission times. The amount of data transmitted at a time must be limited to satisfy the requirement.

Data is divided and transmitted multiple times to satisfy the requirement described above when the maximum amount of data transmitted at a time is predetermined and the average amount of data transmission must not exceed the predetermined amount. In this case, the problem is that, when fixed amount data is not always received at a constant rate, transmitting data in a predetermined average amount sometimes does not satisfy the requirement for the maximum amount of data that is transmitted at a time.

In addition, setting a maximum on the amount of data to be transmitted next based on the data transmission result puts a constraint on the transmission interval and prevents the efficient data transmission.

SUMMARY OF THE INVENTION

It is an object of the present invention to provide a data transmission apparatus and a data transmission method which solve the drawbacks of the prior art described above and which control the transmission data amount so that the requirement is satisfied.

In accordance with the present invention, a data transmission apparatus for transmitting a transmission request to transmit a data signal to a receiver unit and for, upon receiving a data transmission permission from the receiver unit, transmitting the data signal to the receiver unit, comprises a data transmission circuit outputting a received data signal to the receiver unit; a control circuit controlling a maximum transmission amount of the data signal to be transmitted at a time; and a transmission amount storing circuit storing therein an average transmission amount value, the control circuit comprising a first management circuit adding up the average transmission amount value each time the data signal is transmitted and storing therein the added-up value as a first management value, the average transmission amount value being stored in the transmission amount storing circuit; a second management circuit adding up a transmission amount of the data signal transmitted from the data transmission circuit each time the data signal is transmitted and storing therein the added-up amount value as a second management value; and a maximum amount determination circuit determining, based on the first management value and the second management value, the maximum data amount of the data signal to be transmitted next from the data transmission circuit, wherein, with the maximum as a threshold, the data transmission circuit determines an amount of the data signal to be transmitted next and transmitting the transmission request to transmit the amount of the data signal to the receiver unit.

In accordance with the present invention, a method of controlling data transmission for use in a data transmission apparatus for transmitting a transmission request to transmit a data signal to a receiver unit and for, upon receiving a data transmission permission from the receiver unit, transmitting the data signal to the receiver unit, comprises the steps of outputting to the receiver unit a transmission request to transmit the data signal to the receiver unit; generating a flag signal each time the data signal is transmitted; updating first management information representing a sum of a data transmission amount each time the flag signal is detected; updating second management information representing a result of data transmission each time the flag signal is detected; and based on the first and second management information, calculating a maximum of the data signal to be transmitted next, in the step of outputting a transmission request, an amount of the data signal to be transmitted next being determined with the maximum as a threshold, the transmission request requesting to transmit the amount of the data signal being output to the receiver unit, the request.

BRIEF DESCRIPTION OF THE DRAWINGS

The objects and features of the present invention will become more apparent from consideration of the following detailed description taken in conjunction with the accompanying drawings in which:

FIG. 7 schematically shows an example of the self-control effect of data transmission in the embodiment.

DESCRIPTION OF THE PREFERRED EMBODIMENT

Figure 1:
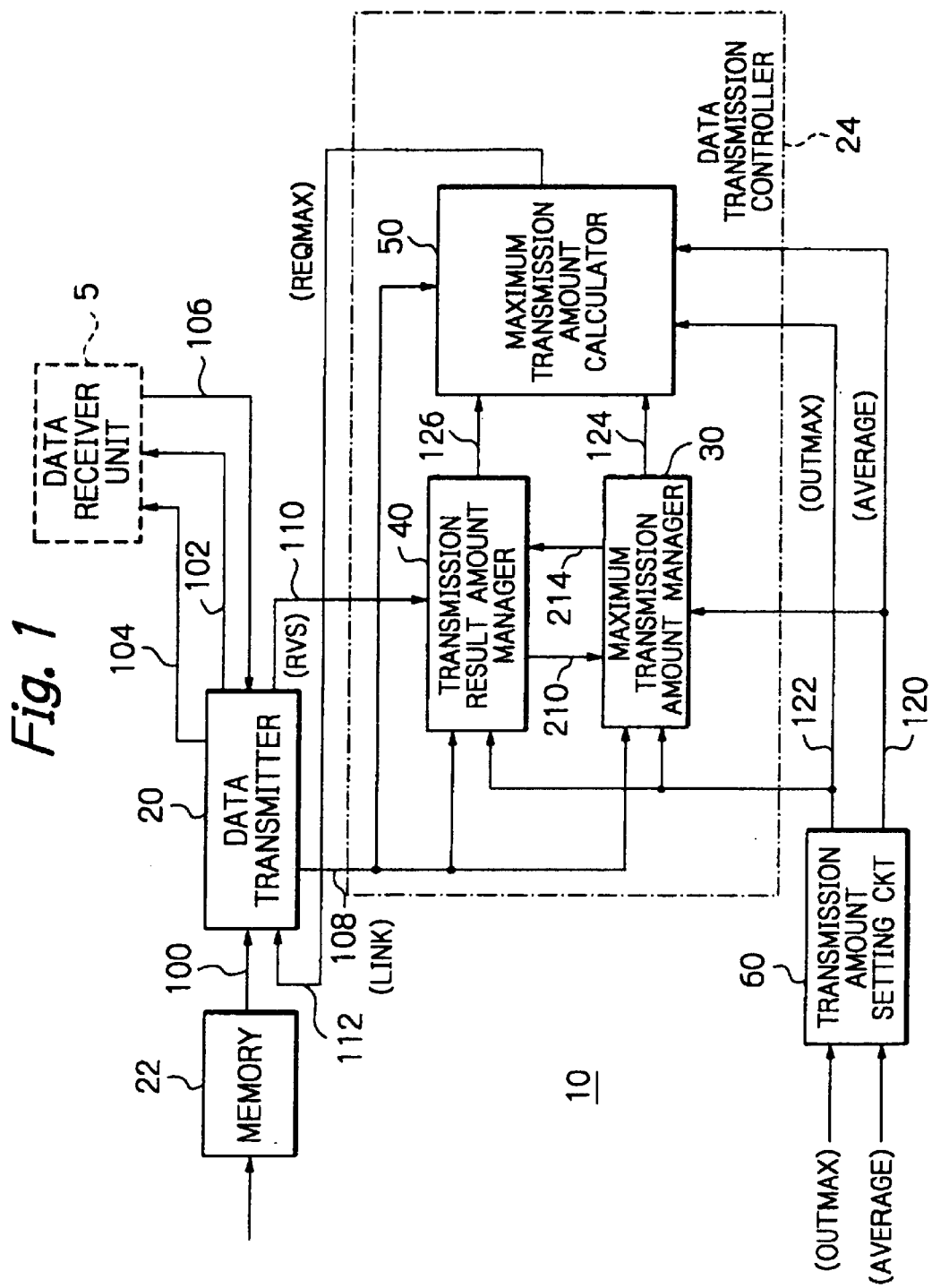
FIG. 1 is a schematic block diagram showing the major components of an embodiment of a data transmission apparatus to which the present invention is applied.

Referring to the accompanying drawings, an embodiment of a data transmission apparatus according to the present invention will be described in detail. FIG. 1 is a schematic block diagram showing the major components of the data transmission apparatus to which the present invention is applied. When sending received data signals to a higher-level data receiver unit 5, a data transmission unit 10 outputs, in the burst mode, the amount of data determined by the data transmission control function upon receiving an output permission signal from the data receiver unit 5. For data transmission between the data transmission unit 10 and the data receiver unit 5, the maximum amount of data generated each time is predetermined and, in addition, the average of data transmission amount is regulated so that it does not exceed a predetermined amount. The data transmission unit 10 controls the transmission of data signals so that these requirements are satisfied. The data transmission unit 10 has the data output control function that varies the maximum threshold for the next transmission, based on the amount of data actually transmitted up to that moment, to control the next per-transmission data amount. In the following description, the illustration and the description of the parts not related directly to the present invention are omitted, and the reference numeral of a signal is represented by the reference numeral of the corresponding connection line.

As shown in FIG. 1, a data transmitter 20 in the data transmission unit 10 receives data signals stored in a memory 22, which contains a memory circuit such as a buffer memory, on an input line 100. The data transmitter 20 controls the amount of data to be transmitted and outputs the data on an output line 102. The data transmitter 20 has an output line 104 over which the transmission request signal is sent, an input line 106 over which the output permission signal is received, and the output line 102 over which data signals are output. These lines are connected to the data receiver unit 5.

Each time the data transmitter 20 outputs the transmission request signal, it generates a flag signal (link) indicating that the data transmission unit 10 has started data transmission and outputs the generated flag signal (link) on an output line 108. The output line 108 is connected to a maximum transmission amount manager 30, a transmission result amount manager 40, and a maximum transmission amount calculator 50 which constitute a data transmission controller 24. The data transmitter 20 in this embodiment outputs the flag signal (link) in one system clock cycle. The data transmitter 20 sends the flag signal to the maximum transmission amount calculator 50 one clock cycle after it sends the flag signal to the maximum transmission amount manager 30 and the transmission result amount manager 40. In this embodiment, the maximum transmission amount calculator 50 performs this control.

The data transmitter 20 outputs a data transmission amount value (rvs), which indicates the actual amount of transmitted data, on an output line 110 connected to the transmission result amount manager 40. The data transmitter 20 receives a maximum next-request amount value (reqmax) from the maximum transmission amount calculator 50 on an input line 112. The data transmitter 20 then determines the data transmission amount with that value as the threshold and outputs the data transmission request signal to the output line 104 to request the transmission of the amount of data indicated by this value. Upon receiving the output permission notification signal from the data receiver unit 5 on the input line 106, the data transmitter 20 transmits the requested amount of data.

On the other hand, a transmission amount setting circuit 60 receives two values from an external unit, not shown in the figure. One is the average transmission amount value (average) indicating the average of per-transmission amount of data that is transmitted from the data transmission unit 10 and the other is the maximum transmittable amount value (outmax) indicating the maximum amount of data that may be transmitted per transmission. The transmission amount setting circuit 60 has a storage circuit containing these values. The average transmission amount value (average) is a predetermined setting regulating the average of data transmission amounts, and the maximum transmittable amount value (outmax) is a predetermined setting regulating the maximum amount of data that may be transmitted for each transmission. The data transmission unit 10 prevents the data amount of each transmission from exceeding the average transmission amount value (average), calculated from the amounts of data already transmitted, and from exceeding the maximum transmittable amount value (outmax).

The transmission amount setting circuit 60 outputs the average transmission amount value (average), which is stored in memory, to an output line 120. The output line 120 of the transmission amount setting circuit 60 is connected to the maximum transmission amount manager 30 and the maximum transmission amount calculator 50. The data transmission unit 10 transmits data with the average transmission amount value (average) as the average amount of transmission data. Also, the transmission amount setting circuit 60 outputs the maximum transmittable amount value (outmax), which is stored in memory, to an output line 122. The output line 122 of the transmission amount setting circuit 60 is connected to the maximum transmission amount manager 30, transmission result amount manager 40, and maximum transmission amount calculator 50 in a data transmission controller 24.

Each time one transmission unit of data is transmitted from the data transmitter 20, the maximum transmission amount manager 30 obtains the average transmission amount value (average) stored in the transmission amount setting circuit 60. It then adds this value to the old value and stores the resulting value for use in managing the maximum amount of transmission data. The maximum transmission amount manager 30 adds up the average transmission amount value (average) each time the flag signal (link) is received from the data transmitter 20. The maximum transmission amount manager 30 prevents the overflow of the added-up maximum value according to the condition signal that will be described later. The maximum transmission amount manager 30 outputs the resulting added-up value to the maximum transmission amount calculator 50 connected to an output line 124.

Figure 2:
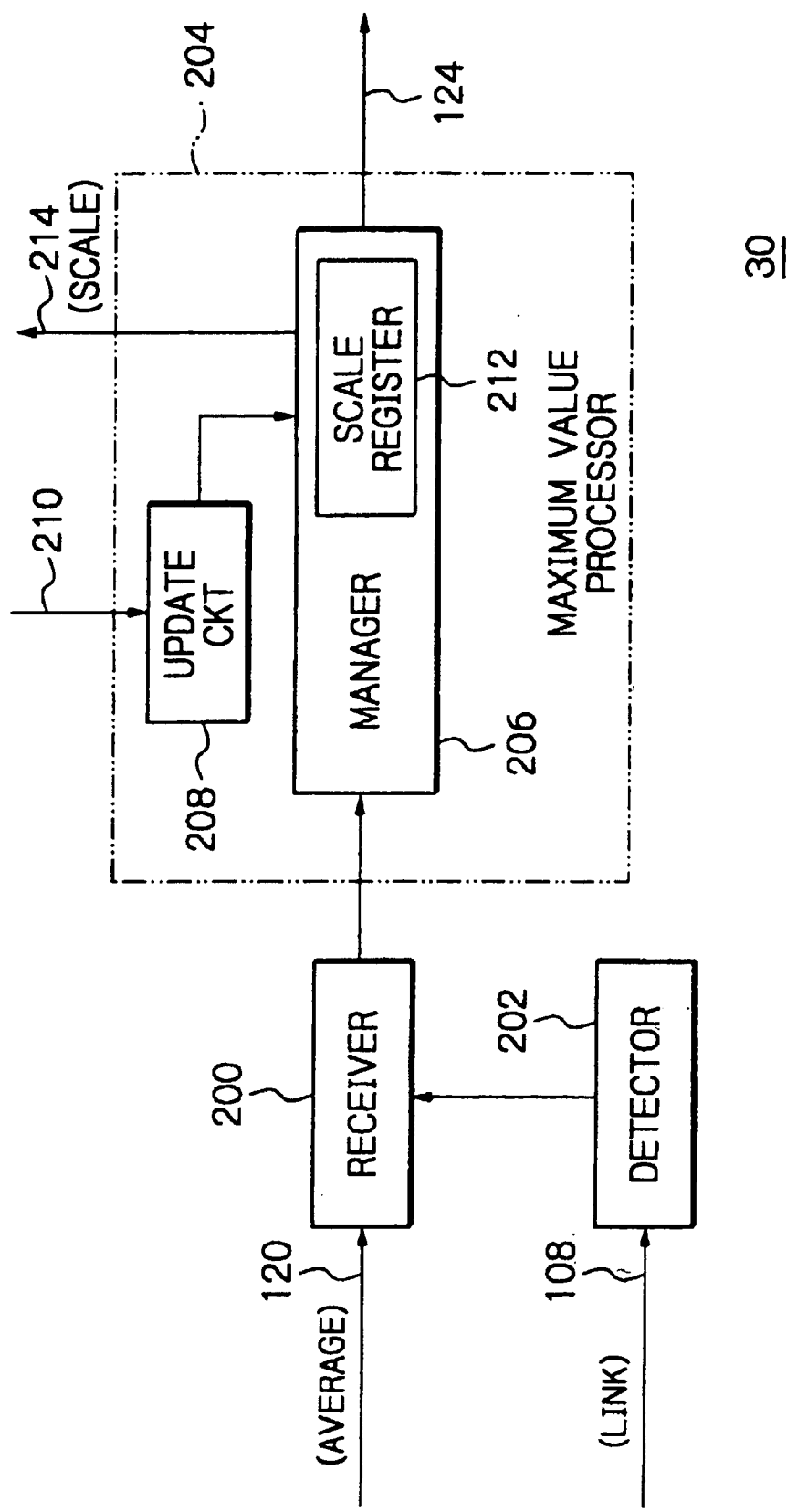
FIG. 2 is a schematic block diagram showing an example of the configuration of the maximum transmission amount manager in the embodiment shown in FIG. 1.

Referring to FIG. 2, the functional configuration of the maximum transmission amount manager 30 will be described. The maximum transmission amount manager 30 comprises a receiver 200 that receives the average transmission amount value (average), a detector 202 that detects the flag signal (link), and a maximum value processor 204 that adds up the average transmission amount value (average) each time the flag signal (link) is detected to calculate a scale value determining the maximum value of the next transmission amount. The maximum value processor 204 comprises a manager 206 that manages the scale value and an update circuit 208 that updates the scale value. Based on the condition signal sent over an input line 210, the update circuit 208 updates the value (scale value) in a scale register 212 provided in the manager 206 to prevent the overflow of the scale register 212. In this embodiment, this condition signal 210 is supplied from a result processor 304. Instead, the maximum transmission amount manager 30 may check the condition to generate the condition signal 210 internally. The output of the scale register 212, which is used as the output of the maximum value processor 204, is sent to the maximum transmission amount calculator 50. The manager 206 outputs the value of the scale register 212 on an output line 214. The output line 214 is connected to the transmission result amount manager 40.

As described above, the maximum transmission amount manager 30 detects the flag signal (link) indicating that the data transmission unit 10 has sent a request and started output. Each time the maximum transmission amount manager 30 detects this signal, it obtains the average transmission amount value (average) from the transmission amount setting circuit 60, adds the obtained value to the old value that is stored, and stores the resulting value in the scale register 212.

The manager 206 resets the value stored in the scale register 212 to any setting value according to the condition signal 210 which will be described later. In addition, when the data transmission unit 10 starts operation, the manager 206 sets the initial value of the scale register 212 to the average transmission amount value (average) obtained from the transmission amount setting circuit 60 and retains the value until the flag signal (link) is detected.

Referring to FIG. 1, the transmission result amount manager 40 will be described. The transmission result amount manager 40 in the data transmission controller 24 obtains the per-transmission data amount, which was actually sent from the data transmitter 20, as the result value. It then adds the obtained result value to the old value and stores therein the resulting value as the sum (sum) of the amounts of data that was transmitted. Each time the transmission result amount manager 40 detects the flag signal (link) on the input line 108, it adds up the data transmission amount value (rvs) received on the input line 110 and outputs the result value indicating the actual transmission amount result to an output line 126. The transmission result amount manager 40 updates the result value according to the condition signal, which will be described later, to prevent the result value from overflowing. The transmission result amount manager 40 outputs the added-up result to the output line 126. The output line 126 of the transmission result amount manager 40 is connected to the maximum transmission amount calculator 50. The transmission result amount manager 40 in this embodiment checks the condition for updating the average transmission amount value (average) and for the result value for each data transmission and generates the condition signal according to the condition.

Figure 3:
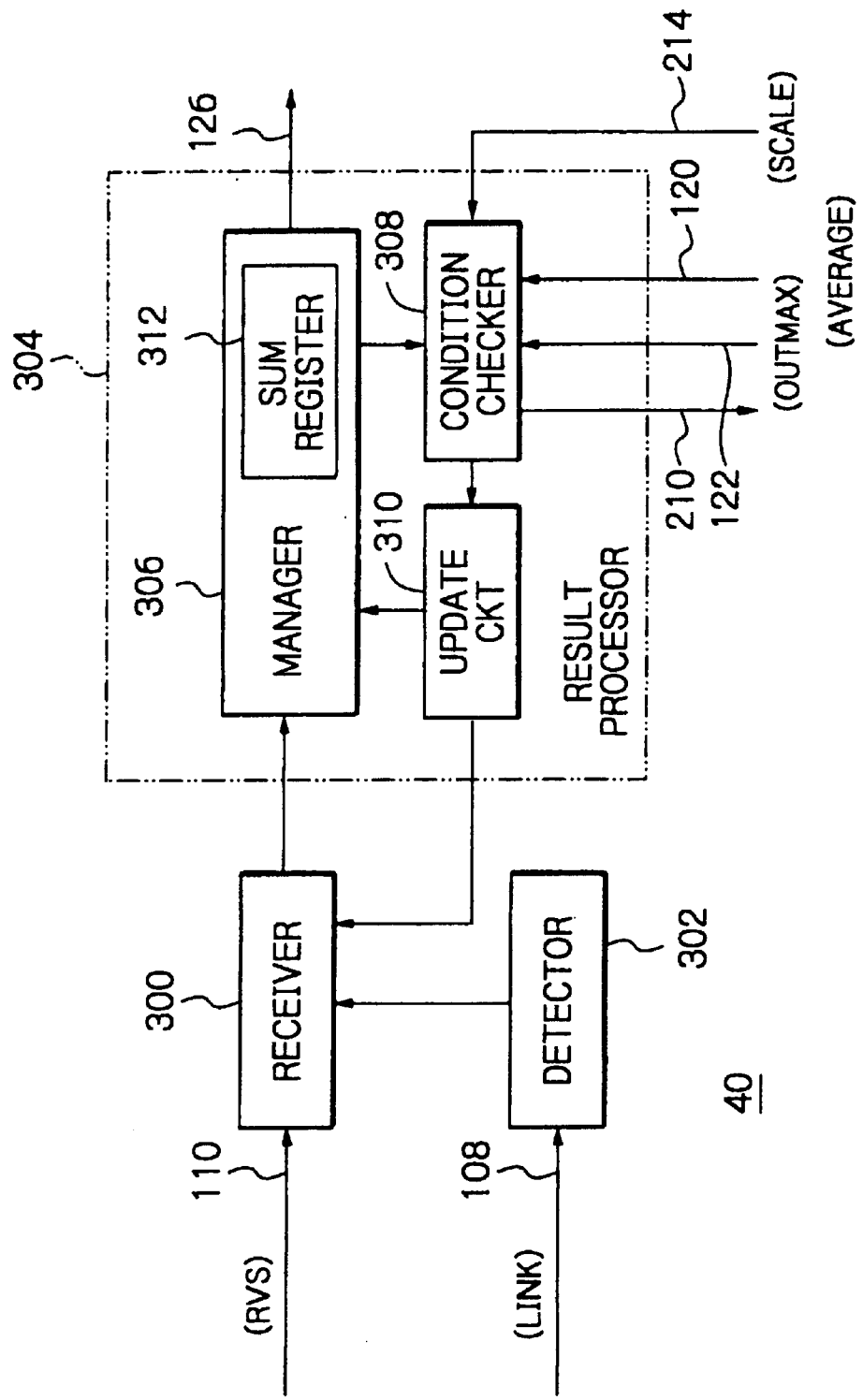
FIG. 3 is also a schematic block diagram showing an example of the configuration of the transmission result value manager in the embodiment shown in FIG. 1.

Referring to FIG. 3, the functional configuration of the transmission result amount manager 40 will be described. The transmission result amount manager 40 comprises a receiver 300 that receives the data transmission amount value (rvs), a detector 302 that detects the flag signal (link) and outputs the detection information, and a result processor 304 that adds up the data transmission amount value (rvs) and calculates the sum (sum) that will be used to determine the maximum of the next transmission amount. The result processor 304 comprises a manager 306 that adds up the data transmission amount value (rvs) received by the receiver 300 and manages the added-up sum (sum), a condition checker 308 that generates the condition signal used to manage the update of the sum (sum) and the value (scale) stored in the above-described scale register 212, and an update circuit 310 that updates the sum (sum) in the manager 306.

The update circuit 310 updates the sum (sum) stored in a sum register 312 provided in the manager 306 according to the condition signal received on the input line 314 to prevent the overflow of the sum register 312. The condition checker 308 generates the condition signal and outputs it on an output line 314 and an output line 210.

Next, how the condition checker 308 generates the condition signal will be described. First, the condition checker 308 subtracts the sum (sum) stored in the sum register 312 from the scale value (scale) received on an input line 214 to check to see if the resulting value (scale−sum) is much larger than the maximum request value (outmax). In this embodiment, the condition checker 308 compares the value, obtained by multiplying the maximum request value (outmax) by the value of n, with the result of the subtraction (scale−sum), as defined by expression (1).

$$(\text{scale}-\text{sum}) > (\text{outmax} \times \text{n}) \tag{1}$$

If the above condition is satisfied, the condition checker 308 then generates a first condition signal indicating a first condition. As the value of n, a value is selected which neither generates a carry from the most significant bit (MSB) nor therefore causes the scale register 212 to overflow. The first condition signal generated by the condition checker 308 is output on the output lines 314 and 210.

In response to the first condition signal 314, the update circuit 310 in the result processor 304 resets the sum register 312 to "0". In addition, in response to this first condition signal 210, the update circuit 208 in the maximum value processor 204 updates the value in the scale register 212 to the average transmission amount value (average) received by the receiver 200. The first condition, which is generated when the amount of data transmitted from the data transmission unit 10 is extremely smaller than the average, means that the requirements are satisfied even if the amount of transmission data is not self-controlled. In this embodiment, the registers 212 and 312 are reset to predetermined values when this condition is satisfied. The registers are reset so that no relative numerical difference is generated in the values in the registers. The operation may be continued by updating and resetting the registers.

If the comparison does not satisfy expression (1), the condition checker 308 checks if the MSB of the sum register 312 is binary "1". If the MSB of the sum register 312 is "1", the condition checker 308 generates a second condition signal indicating that the second condition is generated. The condition checker 308 then outputs the generated second condition signal to the output line 314 and the output line 210, respectively.

When this second condition signal is sent to the input line 314, the update circuit 310 in the result processor 304 changes the MSB of the sum register 312 to binary "0". At the same time, the update circuit 310 adds data transmission amount value (rvs), which is the output amount sent to the receiver 300, to the changed value and stores the resulting value in the sum register 312. In addition, when the second condition signal is sent to the input line 210, the update circuit 208 in the maximum value processor 204 shown in FIG. 2 changes the MSB of the scale register 212 to "0". At the same time, the update circuit 208 adds the average transmission amount value (average), received by the receiver 200, to the changed value and stores the resulting value in the scale register 212.

If neither the first nor the second condition is satisfied, the update circuits 208 and 310 perform normal add-up processing. More specifically, the update circuit 208 in the maximum value processor 204 shown in FIG. 2 adds the average transmission amount value (average) to the value stored in the scale register 212 and stores the resulting value in the scale register 212 as the scale value. In this case, the update circuit 310 in the result processor 304 shown in FIG. 3 adds the data transmission amount value (rvs) to the value stored in the sum register 312 and stores the resulting value in the sum register 312 as the sum (sum).

The values stored and updated in the maximum value processor 204 and the result processor 304 are output, respectively, on the output lines 124 and 126 for transmission to the maximum transmission amount calculator 50.

Figure 5:
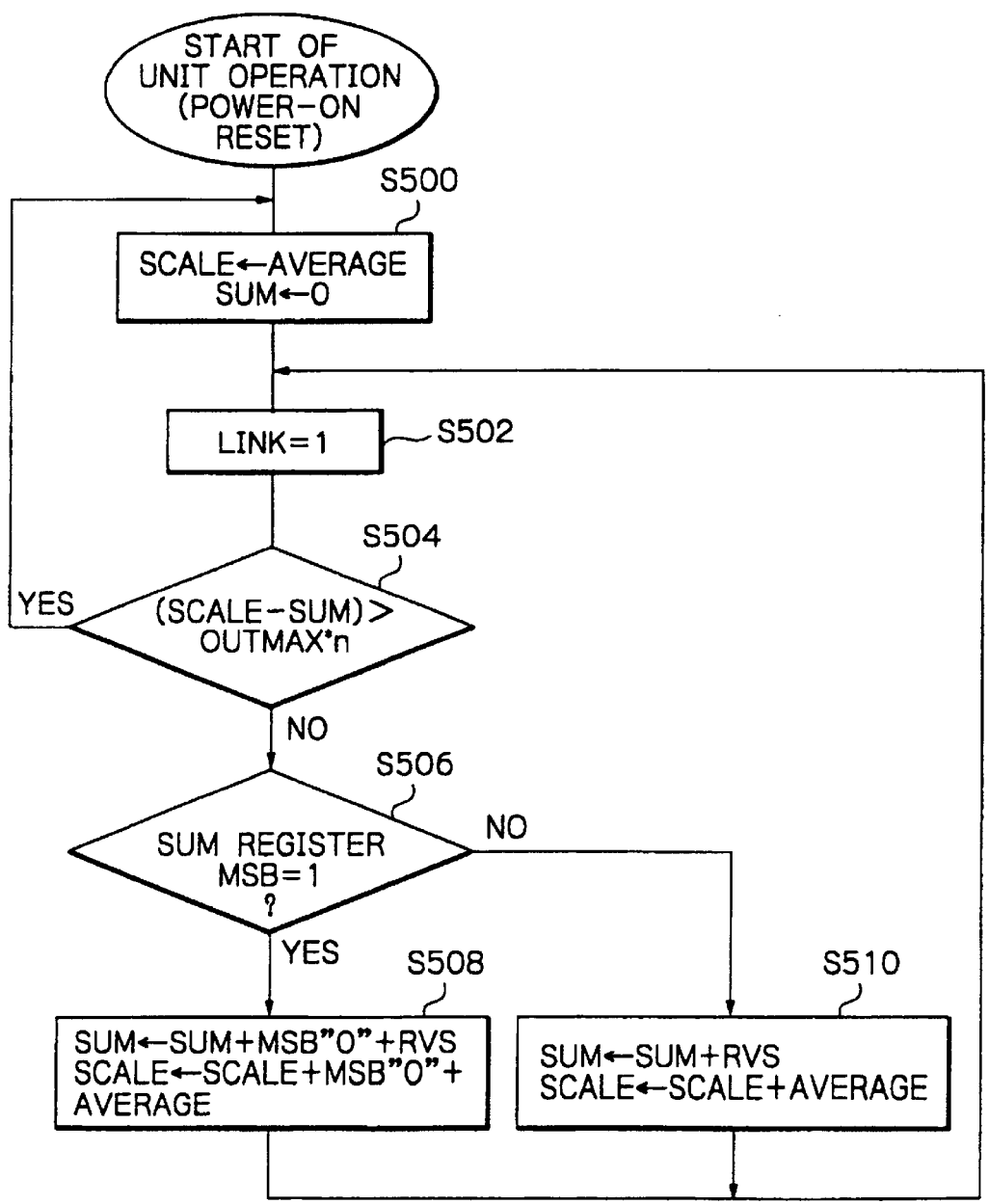
FIG. 5 is a flowchart useful for understanding the operation of the scale register and the sum register provided in the maximum value processor and the result processor.

Referring to FIG. 5, the operation of the registers 212 and 312 in the processors in the maximum value processor 204 and the result processor 304 will be described. First, when the data transmission unit 10 is started, for example, when power-on reset is completed, control is passed to step S500. The scale register 212 is set to the average transmission amount value (average), and the sum register 312 to "0".

When the flag signal (link) is detected in step S502 that follows, control is passed to step S504. In step S504, a check is made to see if expression (1) is satisfied. If expression (1) is satisfied, the first condition signal is generated by the condition checker 308 and control is passed to step S500. The average transmission amount value (average) is set in the scale register 212, and the value of "0" in the sum register 312.

If expression (1) is not satisfied in step S504, control is then passed to step S506. In step S506, a check is made to see if the MSB of the sum register 312 is binary "1". If the MSB is "1", the second condition signal is generated and control is passed to step S508. Conversely, if the MSB of the sum register 312 is not "1", that is, if the MSB is binary "0", control is passed to step S510.

When control is passed to step S508, the MSB of the sum register 312 is changed to "0" and the data transmission amount value (rvs) is added to the changed sum (sum) to update the value in the sum register 312. In addition, the MSB of the scale register 212 is changed to "0" and the average transmission amount value (average) is added to the changed value to update the value stored in the scale register 212. When the updated values stored in the registers 212 and 312 are output to the maximum transmission amount calculator 50, control is passed back to step S502 to wait for the flag signal (link) to be turned on.

On the other hand, in step S510, the data transmission amount value (rvs) is added to the value stored in the sum register 312 to update the value. Also, the average transmission amount value (average) is added to the value stored in the scale register 212 to update the value. The updated values in the registers 212 and 312 are output to the maximum transmission amount calculator 50. After the updated values stored in scale registers 212 and 312 are output to the maximum transmission amount calculator 50, control is passed back to step S502 to wait for the flag signal (link) to be turned on.

As described above, the management values are updated in the maximum transmission amount manager 30 and the transmission result amount manager 40. The updated management values, such as the result and maximum values, are sent to the maximum transmission amount calculator 50.

Referring back to FIG. 1, the maximum transmission amount calculator 50 will be described. The maximum transmission amount calculator 50 in the data transmission controller 24 calculates the maximum next-request amount value (reqmax) based on the result value (sum) and the maximum value (scale) which have been updated by the ring buffer function and on the setting values (average, outmax). The maximum transmission amount calculator 50 outputs the calculated maximum next-request amount value (reqmax) to the output line 112.

Figure 4:
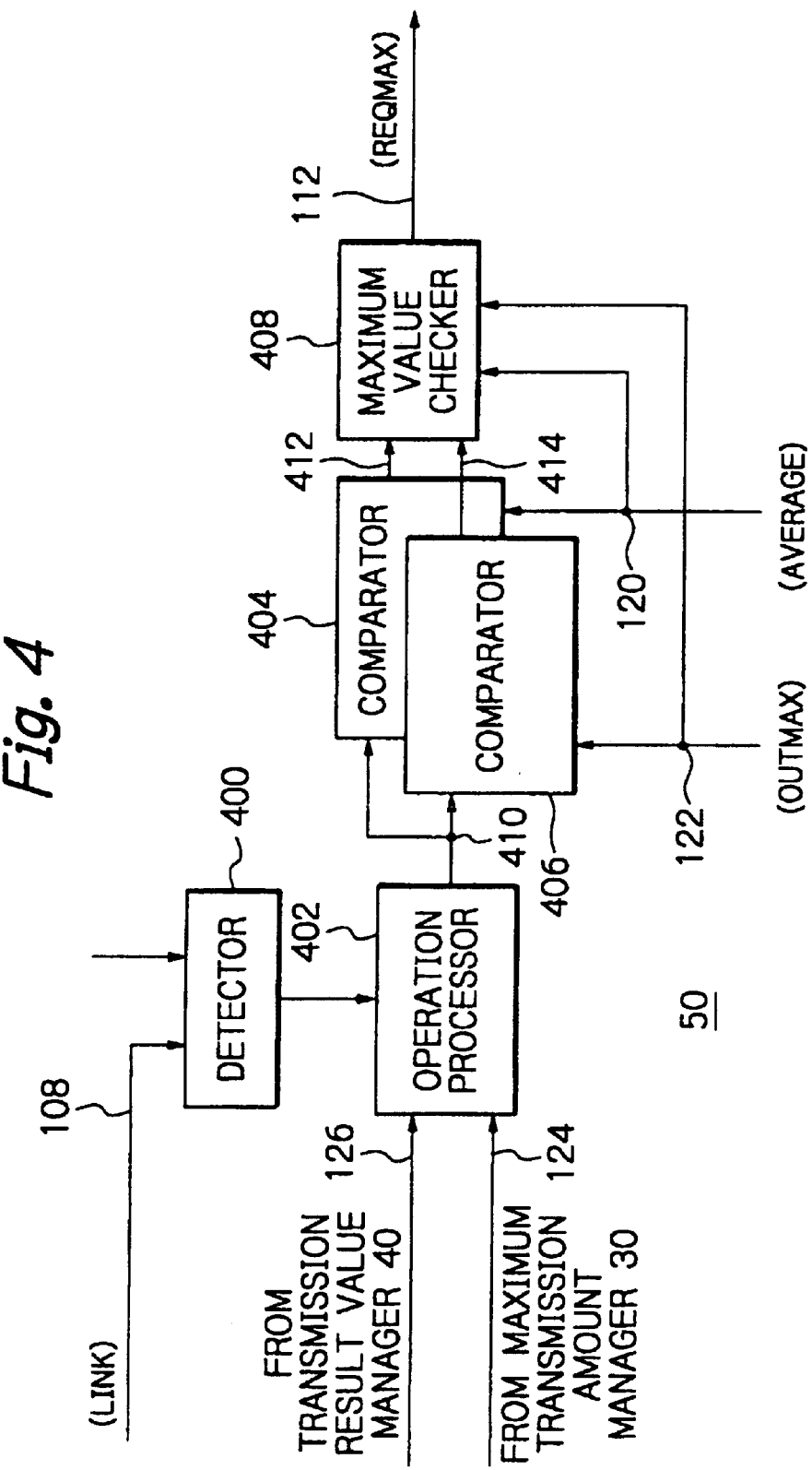
FIG. 4 is also a schematic block diagram showing an example of the configuration of the maximum transmission amount calculator in the embodiment shown in FIG. 1.

Referring to FIG. 4, the functional configuration of the maximum transmission amount calculator 50 will be described. The maximum transmission amount calculator 50 comprises a detector 400, an operation processor 402, a first comparator 404, a second comparator 406, and a maximum value checker 408.

The detector 400 detects the flag signal (link) received on the input line 108 and passes detected information to the operation processor 402. The detector 400 in this embodiment generates detection information a predetermined number of cycles after it detects the flag signal (link) to delay the reception of the flag signal. This reception delay allows the maximum transmission amount manager 30 and the transmission result amount manager 40 to check the condition and update the registers according to the condition and then to calculate the maximum next-request amount value (reqmax) based on the accumulation value. Also, the detector 400 detects operation start information indicating the start of the operation of the data transmission unit 10. The detector passes the operation start information to the components of the data transmission unit 10 and, at the same time, starts the calculation of the maximum next-request amount value (reqmax).

The operation processor 402 is connected to the output line 124 of the maximum transmission amount manager 30 and the output line 126 of the transmission result amount manager 40. Each time the detector 400 detects the flag signal on the input line 108, the operation processor 402 calculates the difference between the scale value (scale) received on the input line 124 and the sum (sum) received on the input line 126. The operation processor 402 outputs the difference, that is, (scale−sum), to an output 410. The output 410 of the operation processor 402 is connected to the first and second comparators 404 and 406.

The first comparator 404 compares the difference (scale−sum) received on the input line 410 with the average transmission amount value (average) received on the input line 120. The second comparator 406 compares the difference (scale−sum) received on the input line 410 with the maximum transmittable amount value (outmax) received on the input line 122. The comparison results of the first and second comparators 404 and 406 are output, respectively, on output lines 412 and 414.

The difference calculated by the operation processor 402 is difference between the value in the scale register 212, which is the added-up value of the maximum transmittable amounts of the data transmission unit determined by the number of times data was transmitted, and the value in the sum register 312 which is the amount of data actually transmitted. This difference is the maximum amount of data that can be transmitted next. With the maximum transmittable amount value (outmax) as the maximum threshold and with the average transmission amount value (average) as the minimum threshold, the amount of data to be transmitted next may be controlled considering this maximum value.

That is, the maximum value checker 408 determines the maximum next-request amount value (reqmax) based on the comparison result received on the output lines 412 and 414. The maximum value checker 408 outputs the maximum next-request amount value (reqmax) to the input line 112.

More specifically, if the difference (scale−sum) is larger than the maximum transmittable amount value (outmax), the maximum value checker 408 outputs the maximum transmittable amount value (outmax) to the output line 112 as the maximum next-request amount value (reqmax). If the difference (scale−sum) is smaller than the average transmission amount value (average), the maximum value checker 408 outputs the average transmission amount value (average) to the output line 112 as the maximum next-request amount value (reqmax). In the other cases, if expression (2) defined below is satisfied, that is, if the difference (scale−sum) is equal to or larger than the average transmission amount value (average) and equal to or smaller than the maximum transmittable amount value (outmax), the maximum value checker 408 outputs the difference (scale−sum) to the output line 112 as the maximum next-request amount value (reqmax)

$$\{\text{average} \leq (\text{scale}-\text{sum}) \leq \text{outmax}\} \quad (2)$$

In this case, the average transmission amount value (average) for the next transmission is already added to the value in the scale register 212 to update the scale value and the sum (sum) is updated in the sum register 312. Therefore, the difference between the values in these two registers is calculated to obtain the maximum next-request amount value (reqmax). The value output from the output line 112 of the maximum value checker 408 is used as the output of the maximum transmission amount calculator 50. This value is sent to the data transmitter 20.

As described above, each time the detector 400 detects the flag signal (link), the maximum transmission amount calculator 50 obtains the scale value from the maximum transmission amount manager 30, and the sum value from the transmission result amount manager 40. The maximum transmission amount calculator 50 compares each of these two values with the corresponding setting value to determine the maximum next-request amount value (reqmax) indicating the amount of data to be transmitted next. Then, it supplies the maximum next-request amount value (reqmax) to the data transmitter 20.

Figure 6:
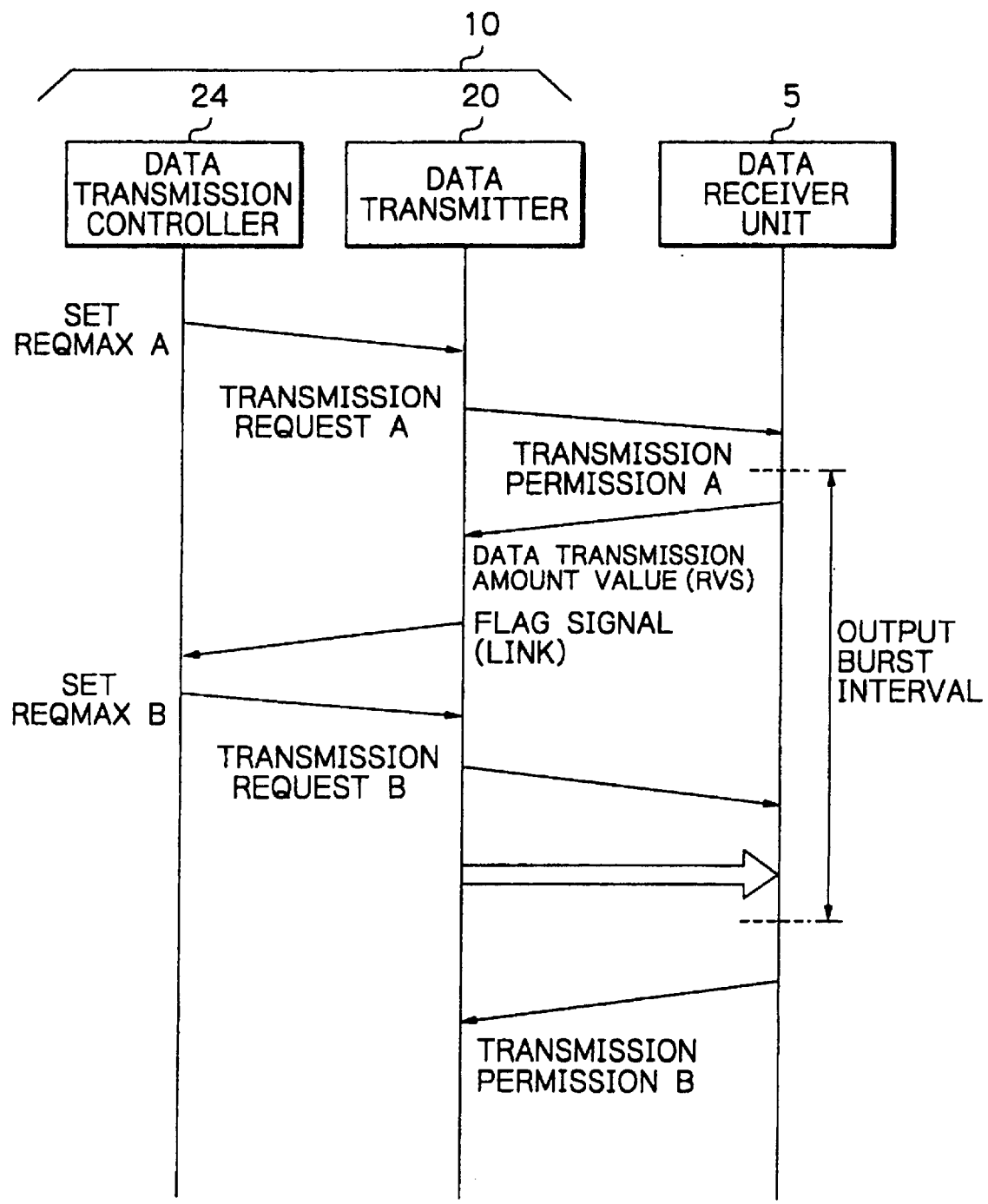
FIG. 6 is a schematic diagram useful for understanding the operation sequence of the data transmission controller and the data transmitter.

Referring now to FIG. 6, the operation of the data transmission unit 10, with the configuration described above, will be described. When the data transmission unit 10 starts operation, operation start information is sent to the components of the unit. Upon receiving this information, the managers 206 and 306 add up values in the resisters 212 and 312 each time the flag signal (link) is detected. Until the flag signal (link) is detected, the maximum transmission amount calculator 50 uses the average transmission amount value (average), which is stored in the transmission amount setting circuit 60, as the maximum next-request amount value (reqmax).

With the maximum next-request amount value (reqmax) as the threshold, the data transmitter 20 determines the amount of data to be transmitted by a request based on the amount of data received by the input signal. The data transmitter 20 sends the transmission request A including the value to the data receiver unit 5.

Upon receiving the transmission permission A from the data receiver unit 5, data transmitter 20 transmits the determined data transmission amount value (rvs) to the transmission result amount manager 40. In response to the flag signal (link), this data transmission amount value (rvs) is added to value stored in the sum register 312. At the same time, the average transmission amount value (average) is added to the value stored in the scale register 212 in the Maximum transmission amount manager 30. After this operation, the maximum transmission amount calculator 50 determines the maximum next-request amount value B (reqmax) according to the calculated difference (scale−sum) and outputs value to the data transmitter 20 on the connection line 112. The data transmitter 20 determines the transmission request amount with the maximum next-request amount value B (reqmax) as the threshold, and transmits the transmission request B, which contains the determined amount value, to the data receiver unit 5. Next, the data signal read from the memory 22 is output on the output line 102 of the data transmitter 20 for transmission to the data receiver unit 5. After that, this operation is repeated. With the maximum next-request amount value (reqmax) as the threshold, the transmission request amount is determined based on the amount of data sent via the input data signal, a transmission request signal is sent on the output line 104, and the data signal is transmitted on the output line 102.

FIG. 7 shows how the data transmission unit 10 in this embodiment self-controls the amount of data that is transmitted. As shown in this figure, from the time the operation is started, the amount of data transmitted by the data transmission unit 10 in each transmission is equal to or smaller than the maximum transmittable amount value (outmax). In addition, immediately after transmitting the amount of data corresponding to the maximum transmittable amount value (outmax), the data transmission unit 10 may continue data transmission in the next burst, ensuring efficient data transmission. Moreover, from the start of operation, the data transmission unit 10, which has the data transmission control function, continuously controls data transmission so that the predetermined average amount of data is transmitted.

In the above embodiment, there is one to one correspondence between the data transmission unit and the data receiver unit. The data transmission unit 10 sends out a transmission request to one higher-level data receiver unit 5 that manages the transmission band and, when the data receiver unit 5 sends back a transmission permission, starts data transmission. In this way, the requirement is permanently satisfied.

The present invention is not limited to a one-to-one system. For example, in a system where a plurality of data transmission units 10, each with the functional configuration described above, each of the data transmission units 10 controls the amount of data to be transmitted to the data receiver unit 5 to share the same transmission bandwidth. To allow each of the data transmission units 10 to transmit an equal amount of data, the data receiver unit 5 receives data from the plurality of data transmission units 10, one at a time. This enables the data transmission units 10, each with the above configuration, to continuously transmit data. The minimum amount of data, as well as the maximum amount of data, transmitted by the data transmission unit 10 is ensured. In addition, when transmitting data continuously in the burst mode, the amount of data that is transmitted is always averaged and the amount of data actually transmitted becomes equal to a value that is set externally.

As described above, the data transmission apparatus according to the present invention adds up the average target amount of data transmission and the actual amount of data transmission each time data is transmitted. Based on the added-up values, the data transmission apparatus determines the maximum amount of data transmission for the next transmission request. Therefore, the amount of data in each data transmission may be controlled so that it does not exceed the predetermined maximum amount and the average amount calculated by averaging the transmission amounts does not exceed the predetermined average.

The entire disclosure of Japanese patent application No. 2000-177118 filed on Jun. 8, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A data transmission apparatus for transmitting a transmission request to transmit a data signal to a receiver unit and for, upon receiving a data transmission permission from the receiver unit, transmitting the data signal to the receiver unit, comprising:

a data transmission circuit outputting a received data signal to the receiver unit;

a control circuit controlling a maximum transmission amount of the data signal to be transmitted at a time; and a transmission amount storing circuit storing therein an average transmission amount value, said control circuit comprising:

a first management circuit adding up the average transmission amount value each time the data signal is transmitted and storing therein the added-up value as a first management value, the average transmission amount value being stored in said transmission amount storing circuit;

a second management circuit adding up a transmission amount of the data signal transmitted from said data transmission circuit each time the data signal is transmitted and storing therein the added-up amount value as a second management value; and a maximum amount determination circuit determining, based on the first and second management values, the maximum data amount of the data signal to be transmitted next from said data transmission circuit, and wherein, with the maximum as a threshold, said data transmission circuit determines an amount of the data signal to be transmitted next and transmits the transmission request to transmit the amount of the data signal to the receiver unit.

2. The apparatus in accordance with claim 1, wherein said maximum amount determination circuit calculates a relative difference between the first management value and the second management value and, based on the relative difference, varies the maximum data amount to be transmitted next.

3. The apparatus in accordance with claim 1, wherein said first management circuit adds up the average transmission amount value each time the data is transmitted to maintain the first management value, said second management circuit adding up the transmission amount of the data signal to maintain the second management value.

4. The apparatus in accordance with claim 3, further comprising a condition checking circuit checking a condition for an update of the first and second management values, wherein said first and second management circuits update the first and second management values, respectively, according to the condition generated by said condition checking circuit.

5. The apparatus in accordance with claim 4, wherein said condition checking circuit resets the first and second management values to predetermined values, respectively, to maintain the relative difference between the first and second management values.

6. The apparatus in accordance with claim 5, wherein said first management circuit comprises a first register containing the first management value, said second management circuit comprising a second register containing the second management value, and wherein said first and second management circuits update the first and second management values, respectively, upon detection of a flag signal generated each time the data signal is transmitted beginning with a time said data transmission apparatus starts operation.

7. A method of controlling data transmission for use in a data transmission apparatus for transmitting a transmission request to transmit a data signal to a receiver unit and for, upon receiving a data transmission permission from the receiver unit, transmitting the data signal to the receiver unit, said method comprising the steps of:

outputting to the receiver unit a transmission request to transmit the data signal to the receiver unit;

generating a flag signal each time the data signal is transmitted;

updating first management information representing a sum of a data transmission amount each time the flag signal is detected;

updating second management information representing a result of data transmission each time the flag signal is detected; and based on the first and second management information, calculating a maximum of the data signal to be transmitted next, in said step of outputting a transmission request, an amount of the data signal to be transmitted next being determined with the maximum as a threshold, the transmission request requesting to transmit the amount of the data signal being output to the receiver unit.

8. The method in accordance with claim 7, wherein in said step of calculating a maximum, the maximum is determined based on a relative difference between the first management information and the second management information.

9. The method in accordance with claim 7, wherein in said step of updating first management information and said step of updating second management information, a first management value and a second management value are updated respectively based on a first setting value regulating a data transmission amount per transmission and on a second setting value regulating a maximum transmittable amount, and in said step of calculating a maximum, a relative difference between the first management value and the second management value is calculated, and the transmission request is output according to the relative difference.

* * * * *